United States Patent [19]

Stanley

[11] 3,883,936

[45] *May 20, 1975

[54] DRAW-CRIMPING TEXTILE FILM STRANDS

[76] Inventor: Robert K. Stanley, 620 Meadowvale Ln., Media, Pa. 19063

[ * ] Notice: The portion of the term of this patent subsequent to Aug. 21, 1990, has been disclaimed.

[22] Filed: May 10, 1974

[21] Appl. No.: 468,731

Related U.S. Application Data

[63] Continuation-in-part of Ser. No. 336,617, Feb. 28, 1973, Pat. No. 3,835,513, which is a continuation-in-part of Ser. No. 124,213, March 15, 1971, Pat. No. 3,753,275, which is a continuation-in-part of Ser. No. 822,429, May 7, 1969, Pat. No. 3,570,083, which is a continuation-in-part of Ser. Nos. 678,428, Oct. 26, 1967, Pat. No. 3,462,814, and Ser. No. 302,758, July 31, 1963, Pat. No. 3,376,622, said Ser. No. 216,525, is a continuation-in-part of Ser. No. 846,457, July 31, 1969, Pat. No. 3,781,852, which is a continuation-in-part of Ser. No. 835,883, June 9, 1969, Pat. No. 3,559,254, which is a continuation of Ser. No. 349,338, March 8, 1964, Pat. No. 3,348,283.

[52] U.S. Cl............................. 28/72.14; 28/DIG. 1
[51] Int. Cl............................................. D02g 1/12
[58] Field of Search................ 28/1.6, DIG. 1, 72.14

[56] References Cited
UNITED STATES PATENTS

| | | | |
|---|---|---|---|
| 3,491,419 | 1/1970 | Satterwhite | 28/72.14 |
| 3,753,275 | 8/1973 | Stanley | 28/72.14 |
| 3,763,520 | 10/1973 | Izawa et al. | 28/1.6 X |

Primary Examiner—Louis K. Rimrodt
Attorney, Agent, or Firm—Charles A. McClure

[57] ABSTRACT

Drawable textile film strands are treated by drawing the same to increased length in a plurality of side-by-side drawing steps and compressively crimping the drawn material, both drawing and crimping being carried out in essentially continuous manner with a minimum of time and space therebetween.

12 Claims, 5 Drawing Figures

DRAW-CRIMPING TEXTILE FILM STRANDS

This application is a continuation-in-part of my similarly entitled copending patent application Ser. No. 336,617 filed 28 Feb. 1973, now U.S. Pat. No. 3,835,513, granted Sept. 17, 1974. That prior application was a continuation-in-part of my application copending therewith, Ser. No. 124,213, filed 15 Mar. 1971, U.S. Pat. No. 3,753,275 which was a continuation-in-part of Ser. No. 822,429, filed 7 May 1969 and now U.S. Pat. No. 3,570,083, which in turn was a continuation-in-part of my prior applications, Ser. No. 678,428, filed Oct. 26, 1967 (now U.S. Pat. No. 3,462,814) and Ser. No. 302,758, filed July 31, 1963 (now U.S. Pat. No. 3,376,622). Reference is also made to my prior application Ser. No. 216,525, filed 13 Aug. 1962 and subsequently abandoned, upon which the last named patent was based at least in part. The first identified application also was a continuation-in-part of Ser. No. 846,457 filed 31 July 1969, U.S. Pat. No. 3,781,952, which in part was a continuation-in-part of Ser. No. 835,883 filed 9 June 1969 U.S. Pat. No. 3,559,254 as a continuation-in-part of Ser. No. 650,762 filed 3 July 1967 (which was abandoned upon the filing of Ser. No. 846,457U.S. Pat. No. 3,781,952), which was in pertinent part a continuation of Ser. No. 349,338 filed 8 Mar. 1964 and now U.S. Pat. No. 3,348,283.

Textile film strands can be produced by extrusion of film-forming composition through a suitable slot into sheet form, slitting the sheet lengthwise, usually after some drawing thereof to increased length, and collecting the resulting strands, which are more or less ribbon-like in configuration but often so narrow as to be substantially equivalent to strands extruded in filamentary form. Many polymeric film-forming compositions so treated produce strands of relatively low tensile strength because of relatively low macromolecular orientation with respect to the longitudinal axis. In most such compositions the orientation and tensile strength can be increased readily because the strand components are drawable (or further drawable) to an attenuated and extended condition of high orientation from which there is little or no tendency to return to the original condition. The strand temperature normally increases during drawing because of intermolecular friction and friction with any snubbing pin or similar means employed to restrict the drawing location. In actual practice the strand, regardless of composition, may be heated to facilitate and to localize the drawing operation.

Textile film strands, whether oriented or unoriented, are inappropriate for many uses because of their rectilinearity, which is conductive to slickness, translucency, and low bulk, all of which can be eliminated or modified by any of a variety of processes usually called "crimping" or "texturing." Nearly all of those processes (e.g., edge-crimping, gear-crimping, jet-crimping, and twist-crimping) tend to extend the strand axially while deforming it transversely of the longitudinal axis and, therefore, may be expected to be compatible with an immediate predrawing operation. Longitudinally compressive crimping, such as stuffer-crimping, of drawn textile film strands may be expected to be separated from the drawing process in location or time (the drawing being prior, usually long prior) rather than adapted to follow immediately upon an attenuation of the strand to increased length.

A primary object of the present invention is novel drawing and crimping of textile film strands.

Another object is provision of means for crimping textile film strands by longitudinal compression along the strand axis immediately following permanent extension therealong.

A further object is continuous draw-crimping of a plurality of textile film strands simultaneously.

Other objects of this invention, together with means and methods for accomplishing the various objects will be apparent from the following description and the accompanying drawings.

In general, the objects of the present invention are attained by tensioning a multiplicity of drawable polymeric textile film strands and thereby drawing them simultaneously to increased length in a plurality of steps located side-by-side in a drawing zone and then compressively crimping the drawn strands, with the effect of buckling successive length increments thereof into crimped configuration. The invention extends more particularly to a process of slitting a polymeric film sheet into a multiplicity of textile film strands, tensioning the strands and thereby drawing them simultaneously to increased length in a plurality of steps in a drawing zone, each of which steps so treats such strands not so treated in any other such step, forwarding the drawn strands to a contiguous compressive crimping zone and crimping them simultaneously in a crimping step in the crimping zone.

Figure 1:
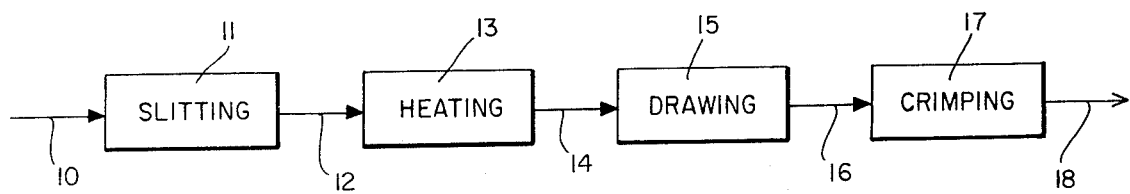
FIG. 1 is a block diagram of process steps according to this invention.

FIG. 1 shows schematically zone 11 wherein textile film sheet 10 is slit into a multiplicity of textile film strands 12, which are preheated in zone 13. Heated strands 14 are attenuated to increased length or "drawn" in draw zone 15, and drawn strands 16 are crimped in compressive crimping zone 17. Resulting strands 18 are withdrawn, as by any conventional system. All views are stylized by omission of supporting, heating, driving, or similar elements.

Figure 2:
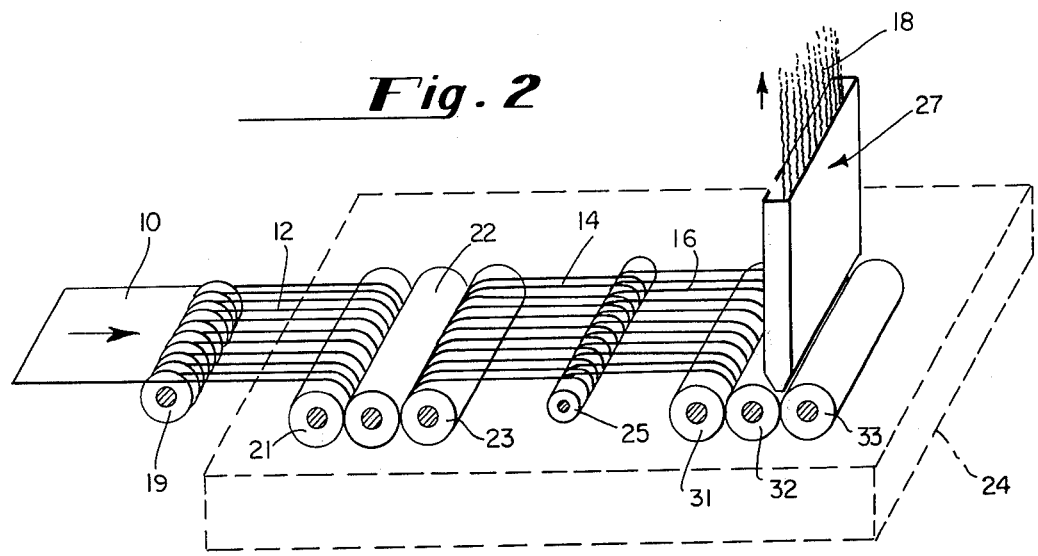
FIG. 2 is a somewhat schematized perspective view of apparatus for the paractice of the process steps suggested in the preceding view.

FIG. 2 shows textile film sheet 10 passing over and being slit into a warp or multiplicity of textile film strands 12 by rotary knives 19 from which they pass into preheating zone 24 (outlined in broken lines). Inside the heating zone are first and second sets of draw rolls 21, 22, 23, and 31, 32, 33 flanking and spaced from draw pin 25. The arrows indicate the passage of the strands immediately into the entrance of stuffer crimper 27 from the output draw rolls without appreciable time intervening. Last two output draw rolls 32 and 33 double as feed rolls at the entrance of the crimper and force thereinto the drawn strands while they are still hot from preheating and drawing. Enclosure 24 about the respective sets of rolls aids in maintaining the strands hot and itself may be heated by any suitable means to that end. Upright stuffer crimper 27 receives the strands from the nip of rolls 32, 33 and emits them in crimped form (18) from the open top of its stuffing chamber. Windup mens, which may be conventional, is omitted as superfluous to an understanding of the invention, as are all supporting, driving, and miscellaneous construction means for like reasons.

Figure 3:
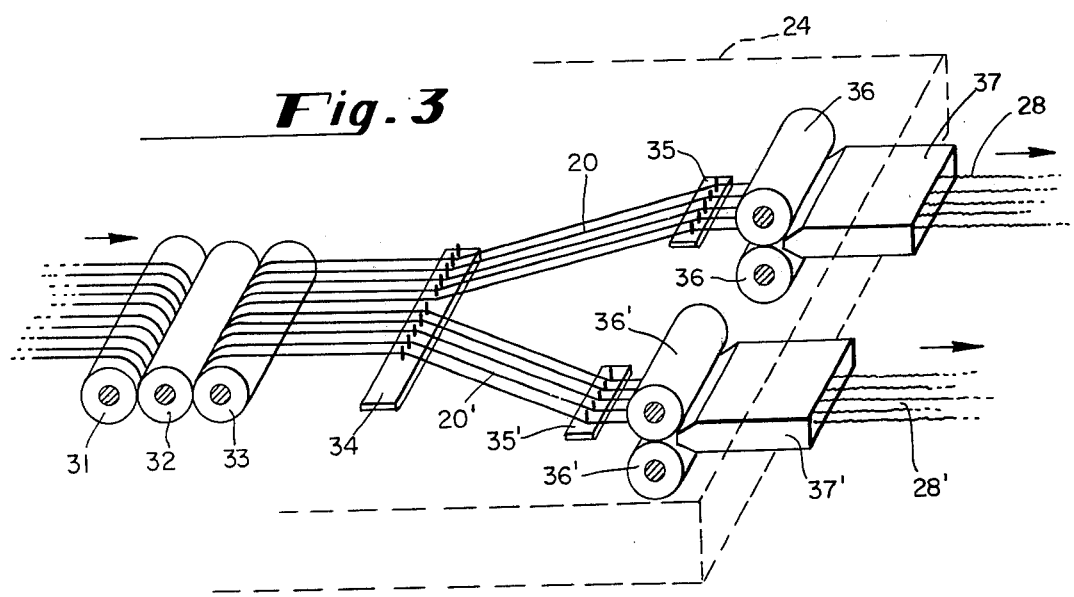
FIG. 3 is a fragmentary perspective view (similar in part to FIG. 2) of a modified arrangement of apparatus for treating strands according to this invention.

FIG. 3 shows, in perspective, sheds 20, 20' of drawn strands, one going obliquely to the left to pin guide 35 and the other going obliquely to the right to pin guide 35'. These respective pin guides are traversable along the next of the pairs of feed rolls to which they are juxtaposed: guide 35 to feed rolls 36, and guide 35' to feed rolls 36'. From the latter guides the respective strand sheds enter crimping chambers 37, 37'. From the chamber exits, groups of crimped strands 28, 28' are withdrawn by suitable means (not shown) for windup or further processing.

Figure 4:
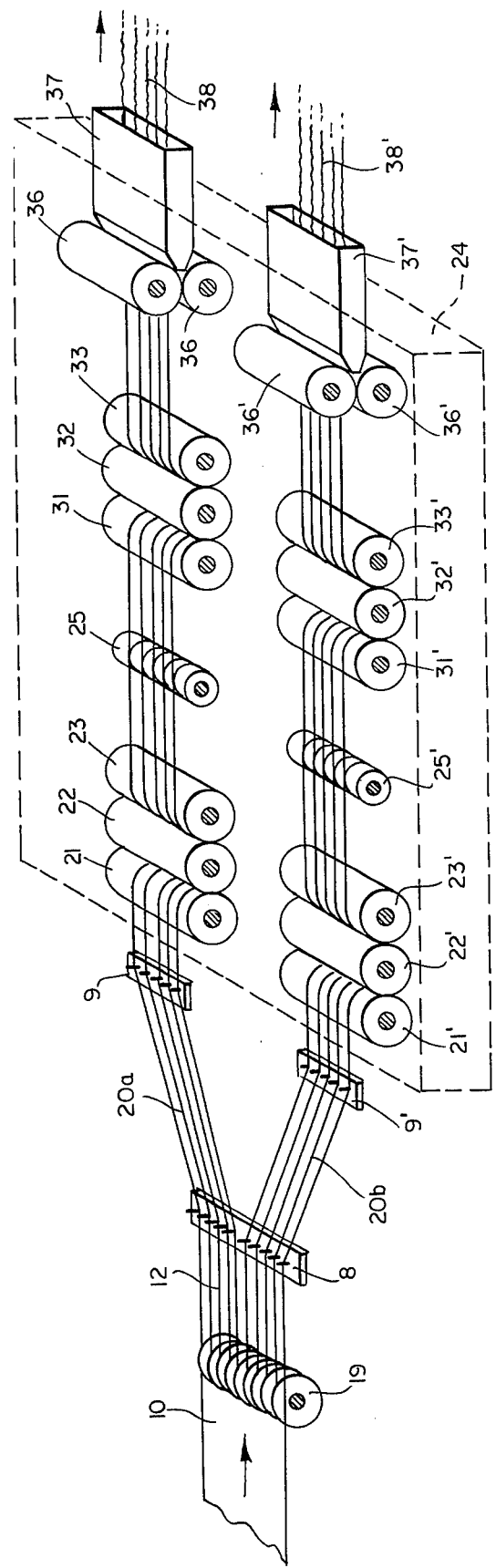
FIG. 4 is a similar view of apparatus modified further according to this invention.

FIG. 4 shows, also in perspective, sheet 10 slit by rotary knives 19 into warp 12 of strands which pass through main pin guide 8, and then in part obliquely to the left as shed 20a and through auxiliary pin guide 9, and the remainder obliquely to the right as shed 20b and through other secondary pin guide 9', and into heating zone 24. The strand sheds are treated side by side, first by a plurality of drawing means in the drawing zone so formed, and then by a like plurality of crimping means in a crimping zone extending from the drawing zone and out of the heating zone.

Thus, in the upper portion of FIG. 4 the left strand shed is drawn by input and output rolls 21, 22, 23 and 31, 32, 33 flanking draw pin 25 as the strand warp was in FIG. 1 and is crimped by a stuffer crimper having pair of nip feed rolls 36 and stuffing chamber 37 as in FIG. 2. In the lower portion of FIG. 4, the right strand shed is treated similarly by means designated the same but with primes added.

Figure 5:
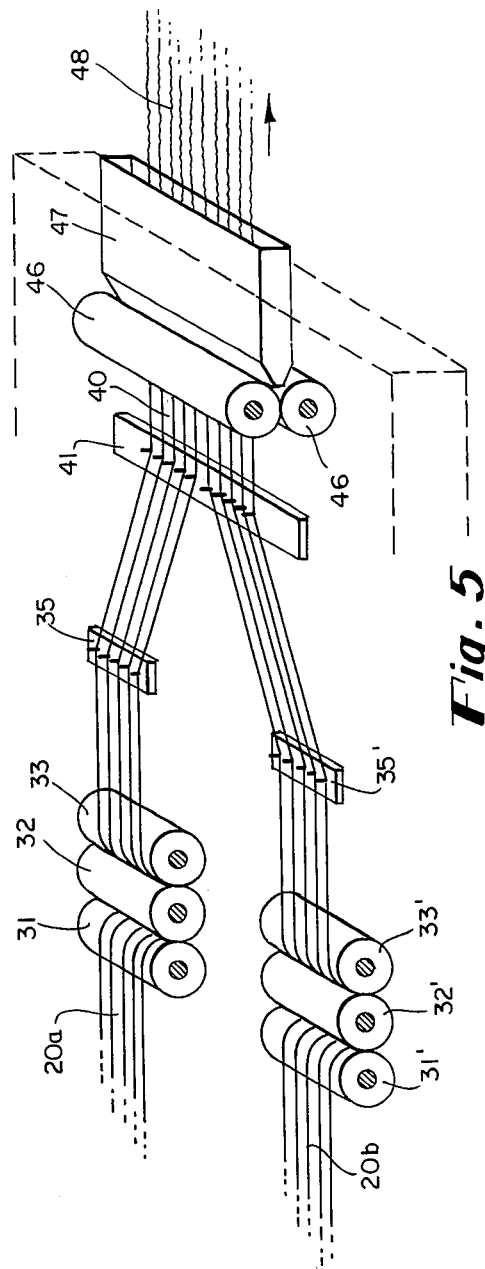
FIG. 5 is a fragmentary view, also in perspective, of a still further apparatus modification useful according to this invention.

FIG. 5 shows the strands from the output or forwarding rolls 31, 32, 33 and 31', 32', 33' for respective sheds 20a and 20b, much as FIG. 3 did for the single warp of FIG. 2. However, in FIG. 5 the sheds pass respectively through auxiliary pin guides 35, 35' and then are combined side by side by main pin guide 41 into warp 40, which then is fed by pair of nip rolls 46 into stuffing chamber 47. Resultant crimped strands 48 are then withdrawn from the stuffing chamber for use or further treatment as in the other instances.

Pin guide 40 in FIG. 5, as well as pin guides 35, 35' in FIG. 3, may be traversable along the crimper feed roll nip. Similar or other traverse means may be interposed between the output draw rolls and crimper feed rolls in the arrangement shown in FIG. 4, if desired.

The strands illustrated side-by-side in FIGS. 2 to 5 are exemplary of multiplicities of such strands as may be formed by conventional slitting of a film sheet. It will be understood that such strands may be fibrillated to an appreciable extent, either beforehand or afterward and that compressive crimping of them, as by stuffer-crimping, is conducive to fibrillation whether or not already partially fibrillated.

It will be understood that at least one of the rolls in each of the two sets of draw rolls is driven directly by the motive means or indirectly by contact (essentially non-slipping) with another. The surface speed of the rolls in the output or forwarding set is greater than the speed of the rolls in the prior or input set, thereby determining the extent to which the strands are drawn therebetween. The draw pin does not rotate but is fixed so as to snub the strands passing about it, thereby frictionally heating the strands, which also are heated by the drawing step itself, as by reason of internal or intermolecular friction. The pin may, but need not, be heated by any conventional means (e.g., electrically or by steam preferably supplied internally) as is customary in the art of strand drawing. It may be omitted in some drawing procedures.

Stuffer crimping useful according to this invention may be wholly conventional and as disclosed, for example, in U.S. Pats. Nos. 3,027,619 or 3,279,025. A suitable design is disclosed in my aforementioned U.S. Pat. No. 3,570,083.

With some strand compositions it may be helpful to heat one or both sets of rolls (in addition to, or instead of, the draw pin). Heating the first set of rolls preheats the strands for drawing, possibly rendering them easier to draw, and incidentally preheating them for crimping--as may the drawing itself. Heating the second set of rolls at least sufficiently to prevent the drawn strands from cooling in the interim (however brief) is conducive to a steady and high degree of crimping. Although not illustrated, methods and means for heating the rolls, preferably internally, will come readily to the mind of a person skilled in the art; e.g., circulation of heated fluid therein, or by electrical means as disclosed in my U.S. Pat. No. 3,111,740. The herein illustrated arrangement of three rolls in each set, with their axes in a common plane and two of the rolls flanking and being contiguous with the other roll, is a useful arrangement, but it is not imperative for the practice of this invention, as will be apparent hereinafter.

In the simple arrangement where the surface speed of the rolls feeding the strand or strands into the crimper or crimpers is the same as the speed at which the strand leaves the drawing zone, i.e., neither an overfeed nor an underfeed according to roll speed, the tendency of the recently drawn strand to retract in length produces in effect an underfeed, be it ever so slight, to the stuffing chamber. The chamber itself is filled to a greater or lesser extent with accumulation of crimped strand, and is otherwise unheated and may be positively cooled (e.g., by circulation of a coolant-- not shown--between the exterior and interior walls thereof) as in my U.S. Pat. No. 3,111,740.

Each straight-length increment of strand entering the stuffing chamber is compressed axialy (i.e., longitudinally) and is forced to buckle, much as an overloaded structural column buckles. Continual buckling of successive length increments at the chamber entrance produces a crimping of the strand. Of course, the continued stuffing of the strand into the chamber forces the terminal part of the strand accumulation therealong. The crimped strands are withdrawn from the exit end of the chamber, which may have a spring-loaded cap as disclosed in my aforementioned patent application or may have alternative types of back-pressure or strand-impeding devices, such as those disclosed in the following U.S. patents, for example: serrated wheel, U.S. Pat. Nos. 3,027,619 and 3,174,206; plunger, U.S. Pat. Nos. 2,758,357 and 2,760,252; or spheroids, U.S. Pat. Nos. 2,949,659 and my 3,440,669. Alternatively, lateral confinement alone may be employed, as in my U.S. Pat. No. 3,279,025.

It will be understood that the term "strand" as used herein includes not only a monofilament strand but also a multifilament strand and that shorter lengths (e.g., staple) than usually termed "continuous" may be present. Suitable strand compositions will come readily to the mind of a person skilled in the textile arts. Prominent among the suitable compositions are thermoplastic film-forming materials, such as polyhydrocarbons (e.g., polyethylene, polypropylene), and polyesters (e.g., polyethylene terephthalate). This list is simply exemplary and is not intended to be exhaustive of suitable compositions.

If a heated draw pin is used the appropriate temperature for it will depend upon the characteristics of the strand composition and the speed of the strands over the draw pin. Appropriate processing speeds lie in the range of from one hundred to one thousand yards per minute (ypm), but somewhat slower or faster speeds may be employed. The speed at which the strands are fed into the stuffer-crimper (or stuffer-crimpers) correlates with the output speed from the drawing zone, of course, and the roll temperature preferably prevents the strands from cooling before entering. Such crimpers preferably are constructed to maintain the strand temperature while under crimping compression, as in my U.S. Pat. No. 3,348,283.

As shown in FIG. 2, the nip of rolls 32 and 33 may be utilized to constitute a junction of the drawing and crimping zones by deleting the portion of strand path about illustrated roll 31 (which may then be deleted), a modification that is most useful with monofilament or small multifilament strands because of the likelihood of slippage with other strands by reason of reduced roll surface contact therewith. The rate of strand travel in such intervening portion of the strand path may be substantially the same as at the end of the drawing zone; it should not be less and may be more, thereby tensioning the strands further and, if desired, actually drawing them further.

Enhanced underfeed is accomplished conveniently according to the arrangement of subsequent views, for example by regulating the surface speeds of the various sets of rolls in any suitable manner, which may be conventional in itself, so that the pair or pairs of crimper feed rolls have a speed faster than that of output draw rolls. The feed rolls may run anywhere from several percent to perhaps ten percent, or somewhat more, faster than the draw rolls while merely tensioning the strands, already drawn to increased length. Alternative stuffing means (e.g., fluid jets) may be substituted for the more conventional stuffing rolls to feed the strand into the stuffing chamber. Of course, conventional godets may be substituted for nip rolls at either end (or both ends) of the drawing zone, regardless of the type of crimper infeed.

At greater than about ten percent roll overspeed, corresponding to strand underfeed, the strands probably will be drawn to further increased length, unless a maximum draw for the particular strand composition already had been imposed, and such further draw may equal or even exceed the previous draw if desired. It is preferred, although not necessary, that the strands not have been drawn significantly at a remote previous time, although appreciable benefit from the present invention may be attained if such previous draw did not exceed about half the total drawability of the undrawn material, thereby leaving it still substantially drawable. It is preferred to limit the degree of underfeed to the crimper to at most half the total drawing underfeed, or usually to not much more than about 200 percent. A range of from about 5 to 50 percent underfeed is preferred when little or no added draw is desired, and a range of from about 100 to 200 percent when substantial added draw is desired at the crimper input.

Other variations in or modifications of the described apparatus and process may be made without involving a departure from the inventive concept. Although textile film strands are emphasized, strands extruded in filamentary form may be treated likewise with good effect. Any similarly useful compressive crimping device may replace the illustrated stuffer-crimper, which is merely exemplary, as is the spring-loaded cap as the device for applying back-pressure to the strand accumulation in that crimper. Except when using the last previously mentioned type of stuffer crimper, windup of the crimped textile film strands expelled from the chamber preferably should be synchronized without, however, withdrawing any thereof from ahead of the back-pressure device.

Strands crimped according to the present invention are characterized by excellent crimp stability, despite absence of conventional strain-relieving features, which have been customary despite the complication and expense attendant thereon. Control of the traveling strands, especially at high rates of travel, such as in the vicinity of a thousand yards per minute, is comparable to that obtainable with overfed strands at lower rates, such as several hundred yards per minute. Other benefits and advantages of this invention, which produces crimped textile film strands of exceptional bulk, will become apparent and accrue to those who undertake to practice it as defined in the following claims.

The claimed Invention:

1. Continuous draw-crimping process for textile film strands, comprising the sequentially contiguous steps of tensioning a multiplicity of drawable textile film strands and thereby drawing them simultaneously to increased length in a plurality of drawing steps arranged side by side in a drawing zone and then compressively crimping the drawn strands.

2. Draw-crimping process according to claim 1, including the step of preheating the strands for drawing.

3. Draw-crimping process according to claim 2, including maintaining the strands hot during the drawing step and to at least the beginning of the contiguous crimping step.

4. Draw-crimping process according to claim 3, wherein the strands are maintained at essentially constant temperature from preheating until assuming crimped configuration.

5. Process comprising slitting a polymeric film sheet into a multiplicity of textile film strands, tensioning the strands and thereby drawing them simultaneously to increased length in a plurality of steps in a drawing zone, each of which steps so treats such strands not so treated in any other such step, forwarding the drawn strands to a contiguous compressive crimping zone and crimping them simultaneously in a crimping step in the crimping zone.

6. Draw-crimping process according to claim 5, wherein a first plurality of the strands are drawn by a first set of draw rolls in the drawing zone and simultaneously a second plurality of the strands are drawn by a second set of draw rolls in the drawing zone.

7. Draw-crimping process according to claim 5, wherein all the strands are crimped by a given stuffer crimper in the crimping zone.

8. Draw-crimping process according to claim 5, wherein a first plurality of the strands are crimped by a first stuffer crimper in the crimping zone and simultaneously a second plurality of strands are crimped by a second stuffer crimper in the crimping zone.

9. In treatment of textile film strands, the improvement comprising preheating a multiplicity of textile film strands to increased temperature, drawing the hot strands to increased length over a set of draw rolls, and compressively crimping the drawn strands in a plurality of stuffer crimpers arranged side-by-side.

10. Treatment of textile film strands according to claim 9, including the step of maintaining the temperature of the strands substantially constant from the drawing step to the crimping step.

11. In treatment of textile film strands, the improvement comprising preheating a multiplicity of textile film strands to increased temperature, drawing the hot strands to increased length over a plurality of sets of draw rolls, each set including input rolls and faster running output rolls over which the strands pass in essentially non-slipping surface contact, and compressively crimping the drawn strands.

12. Treatment of textile film strands according to claim 11, including the step of maintaining the temperature of the strands substantially constant from the drawing step to the crimping step.

* * * * *